United States Patent [19]
Breggin et al.

[11] Patent Number: 5,848,272
[45] Date of Patent: Dec. 8, 1998

[54] OBJECT-ORIENTED INTRA-PROCESS MESSAGING ARRANGEMENT FOR WINDOWS ENVIRONMENTS

[75] Inventors: David G. Breggin, Littleton; David V. Rukstales, Denver, both of Colo.

[73] Assignee: Lucent Technologies Inc., Murray Hill, N.J.

[21] Appl. No.: 660,329

[22] Filed: Jun. 4, 1996

[51] Int. Cl.⁶ ........................................ G06F 9/22
[52] U.S. Cl. ............................................. 395/683
[58] Field of Search .................... 395/683, 680, 395/701, 335; 345/335

[56] References Cited

U.S. PATENT DOCUMENTS

| | | | |
|---|---|---|---|
| 4,975,829 | 12/1990 | Clarey et al. | 364/200 |
| 5,079,695 | 1/1992 | Dysart et al. | 395/700 |
| 5,136,708 | 8/1992 | Lapourtre et al. | 395/650 |
| 5,179,585 | 1/1993 | MacMillan, Jr. et al. | 379/88 |
| 5,379,426 | 1/1995 | Foss et al. | 395/650 |
| 5,434,975 | 7/1995 | Allen | 395/200 |
| 5,608,908 | 3/1997 | Barghouti et al. | 395/703 |
| 5,619,710 | 4/1997 | Travis, Jr. et al. | 385/800 |
| 5,655,152 | 8/1997 | Ohnishi et al. | 395/856 |

FOREIGN PATENT DOCUMENTS

| | | | |
|---|---|---|---|
| 0592091 | 4/1994 | European Pat. Off. | G06F 9/46 |
| 0602845 | 6/1994 | European Pat. Off. | G06F 9/44 |

OTHER PUBLICATIONS

Apple Computer, Inc., Inside Macintosh, Addison–Wesley Publishing Company, Inc., vol. 1, pp. 309–334, 1985.
J. M. Richter, Windows 3.1: A Developer's Guide, second edition, M&TBooks, pp. 22–43, 285–293, 1992.
D. de Champeaux, et al., Object–Oriented System Development, Addison–Wesley Publishing Company, 1993, pp. 81–101.
M. J. Bach, The Design of the UNIX® Operating System, AT&T, 1986, pp. 111–117, 200–211, 355–389.

Primary Examiner—Alvin E. Oberley
Assistant Examiner—Sue Lao
Attorney, Agent, or Firm—David Volejnicek

[57] ABSTRACT

An intra-process communication arrangement (FIG. 2) that is implemented through standard Windows™ operating system facilities and that facilitates object-oriented programming by enabling program modules (210–212) of a single application program (106) to communicate with each other without having explicit knowledge of each other. The arrangement uses a Windows custom control (105) that is configured to support the object-oriented programming concept of classes. The custom control registers modules and indications of their class in an object-instances list (200) and allows messages to be implicitly addressed by class to one or more modules that are members of that class.

19 Claims, 4 Drawing Sheets

OBJECT-ORIENTED INTRA-PROCESS MESSAGING ARRANGEMENT FOR WINDOWS ENVIRONMENTS

TECHNICAL FIELD

This invention relates to communications among program entities.

BACKGROUND OF THE INVENTION

Microsoft Corporation's Windows™ operating system provides standard inter-process communications mechanisms—that is, mechanisms for communicating between different Windows application programs, and/or between application programs and the operating system programs—that allow the programs to communicate with each other via a common interface. That is, the communicating programs need not have any knowledge of each other's "internals". An example thereof is the Dynamic Data Exchange (DDE) mechanism. Correspondingly, the Windows operating system views each application program as a "black box"—an indivisible unit whose "internals" are not known to the Windows operating system. Therefore, the Windows operating system is conventionally unable to provide such standard communications mechanisms for intra-process communications—that is, for communications between different modules, or subprograms, of a single application program. Consequently, each developer of an application program must generally implement and/or incorporate an intra-process communication mechanism into each application program that is structured as a collection of sub-programs.

Some attempts have been made to provide intra-process communications mechanisms for the Windows operating system environment. One example thereof is the "Message VBX" tool. Another example may be found in Release 4 of the Visual Basic programming package. However, these mechanisms have the disadvantage that the communicating sub-programs must have some familiarity with each other. That is, they need to have explicit knowledge of each other's "internals", or at least of each other's identities. This requirement violates the basic principles of object-oriented programming, which is presently the preferred programming methodology for both Windows and other operating-system environments. Object-oriented programming is a type of programming that provides a way of modularizing programs by establishing partitioned memory areas for both data and procedures that can be used as templates for spawning copies of such modules on demand. A description of object-oriented programming in the Windows environment is found in E. R. Tello, Object-Oriented Programming for Windows™, John Wiley & Sons, Inc. (1991). The principles of object-oriented programming that are violated by requiring sub-programs to have knowledge of each other "abstraction" (that one program module should not need to know anything about any other program module in order to communicate with the other module) and "encapsulation" (that one program module should only need to know a rigorously-defined interface in order to communicate with any other program module, without regard for the other modules'"internals").

Hence, what the Windows operating-system environment needs is an intra-process communications mechanism that is supported by the Windows operating system and that satisfies the principles and requirements of the object-oriented programming methodology. What is further needed is such a mechanism that does not require a redesign of, or changes to, the standard Windows operating system.

SUMMARY OF THE INVENTION

This invention is directed to meeting these and other needs of the prior art. Generally according to the invention, there is provided a communication arrangement that is implemented through standard Windows or other operating-system facilities and that facilitates object-oriented programming by enabling program modules of a single program—e.g., a single application—to communicate with each other without having explicit knowledge of each other, i.e., without knowing each other's "internals" or identities. This is effected through use of the object-oriented programming concept of classes. While intended primarily for intra-process communications, the arrangement may optionally also be used for inter-process communications.

According to one specific aspect of the invention, a computer comprises a memory for storing an application program comprising a plurality of program modules each belonging to at least one of a plurality of different classes of modules, and further for storing a control arrangement that defines both a plurality of executables each corresponding to a different one of a plurality of commands and an object-instances list of characterizations of the modules, each of which characterizations indicates the class of the corresponding module. The computer further comprises a processor connected to the memory for executing the program modules and the executables. In response to an executing one of the modules issuing one of the commands accompanied by a message and a class identifier, the processor executes the one command's corresponding executable and thereby selects from the object-instances list by class in a predetermined manner at least one of the modules belonging to the identified class for receipt of the message, and sends the message to the selected at least one of the modules. Preferably, the selection of the at least one module is effected by searching the object-instances list either for a first or for each module characterization that includes the class identifier which accompanied the issued command.

According to a second specific aspect of the invention, a method of communicating between a plurality of program modules each belonging to at least one of a plurality of different classes of modules comprises the following steps. In response to an executing one of the modules issuing one of a plurality of commands accompanied by a message and a class identifier, the one command's corresponding executable from among a plurality of executables each corresponding to a different one of the commands is executed. By execution of the one command's corresponding executable, at least one of the modules belonging to the identified class is selected by class in a predetermined manner from an object-instances list of characterizations of the modules, each of which characterizations indicates the class of the corresponding module. Further by execution of the one command's corresponding executable, the message is sent to the selected at least one of the modules.

According to a third specific aspect of the invention, a computer-usable program storage device has embodied therein means for effecting the above-characterized method, which means are user-readable program code means that cause the computer to perform the above-characterized method steps.

Illustratively, the plurality of program modules comprise a single application program. Preferably, the method-step executions are performed under the control of, and the control arrangement of the computer comprises, the Windows operating system in general, and a custom control utility of the Windows operating system in particular.

In addition to providing an intra-process communications mechanisms in the Windows operating system environment that satisfies the principles and requirements of object-oriented programming without changes to the standard Windows operating system, an illustrative implementation of the invention provides the following advantages:

- ability to address a message either to an individual member or to all members of a class (i.e., a subset of all modules), or to all modules,
- ability to notify the message-sending module if a message destination is unavailable,
- ability to include message content (data) as well as a message-type indication and a return address of the sender in the message, and
- ability to designate a "universal receiver" class which receives all messages, regardless of the intended destination or destinations (e.g., to facilitate message-logging and tracking activities). These additional features make for a very robust and versatile intra-process communications tool.

These and other advantages and features of the present invention will become more apparent from the following description of an illustrative embodiment of the invention taken together with the drawing.

DETAILED DESCRIPTION

Figure 1:
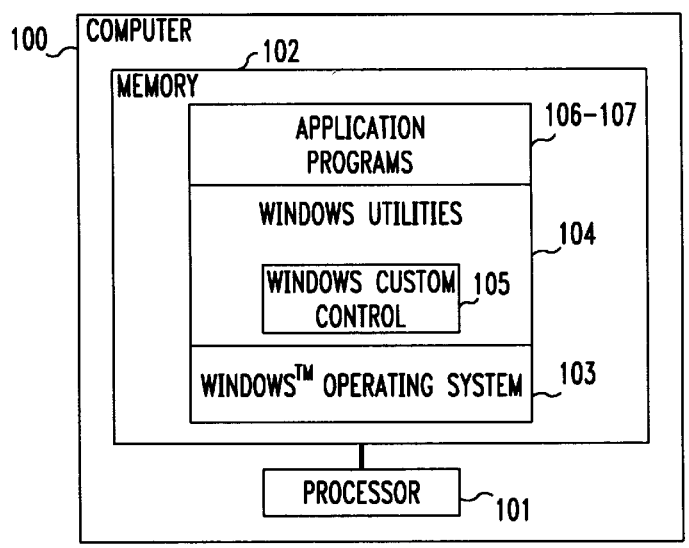
FIG. 1 is a block diagram of a conventional computer.

FIG. 1 shows a typical computer 100 such as a personal computer (PC). It comprises a processor 101 that executes programs which are stored in a memory 102. Included among the programs are the Windows operating system 103, Windows utilities 104 that include a Windows custom control 105, and application programs 106–107. Memory 102 may include both a computer internal memory, such as RAM and hard disk, as well as a portable memory, such as a floppy disk, a PCMCIA memory module, or a CD-ROM. Custom control 105 and application programs 106–107 are especially suited for storage on a portable memory. Windows custom control 105 is a part of the Windows libraries suite. It supports Windows applications-programmers' development of Windows graphical user-interfaces (GUIs) to application programs. Custom control 105 provides programmers with a facility to define commands, to write program modules that correspond to (i.e., whose execution is invoked by means of) the commands, and to list and describe each Windows "instance" (i.e., each manifestation of a template of a Windows entity, such as a particular GUI window). Custom control 105 supports the concept of classes of instances, wherein each instance can be assigned to—and hence be described in part by—one of a plurality of different instance types or classes. A class is a template for creating actual functioning objects of a given type. The objects that have been created of a given class are called instances of that class. Illustrative examples of commercially-available Windows custom control 105 are Visual Basic eXtensions (VBX) and Object Linking and Embedding (OLE) Control eXtensions (OCX).

According to an illustrative embodiment of the invention, Windows custom control 105 is used to implement an object-oriented-programming-compliant intra-process messaging arrangement without modification of the standard Windows operating system 103. This implementation is shown in FIG. 2.

Figure 2:
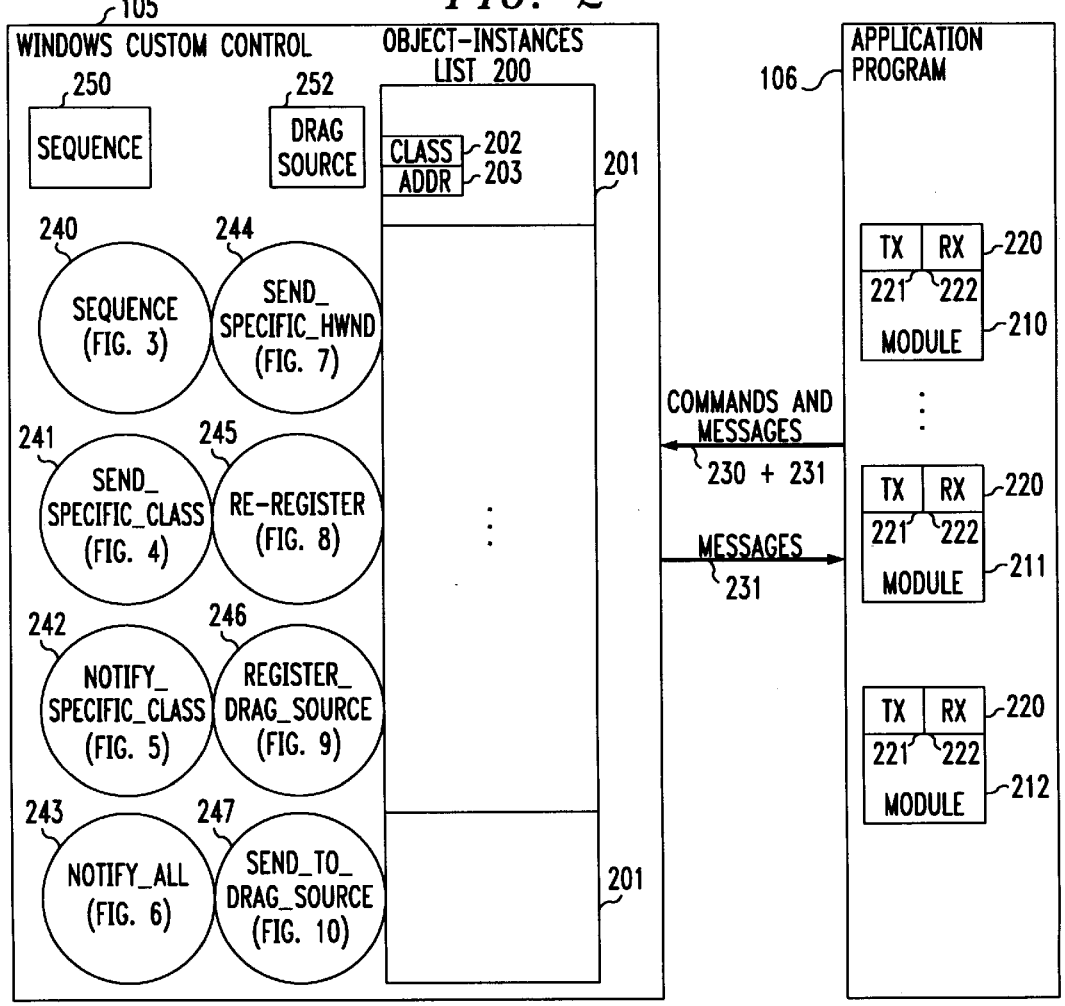
FIG. 2 is a block diagram of those portions of Windows custom control and an application program of the computer of FIG. 1 that implement an illustrative embodiment of the invention.
Figure 3:
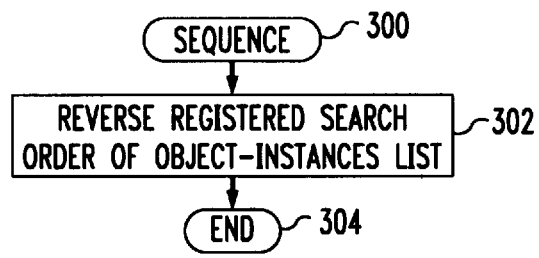
FIG. 3 is a flow diagram of operations executed in the computer of FIG. 1 in response "sequence" command.

As shown in FIG. 2, an application program 106 is designed, according to the principles of object-oriented programming, as a collection of program modules 210–211, called objects. Objects are programming structures that combine code with the data structures it manipulates. Each program module 210–211 has an interface 220 to custom control 105 that functions as a virtual transmitter 221 and a virtual receiver 222 for intra-process messages 231 having a format of "message type; data; return address". (For some messages, the "data" fields may be empty.) The message types are represented by integers, and are internally defined by the processes. The data are any desired data. The return address is the address of the interface 220 that acted as the message sender. Each module 210–211 has one interface 220 for each class to which it belongs; hence, if a module 210–211 belongs to more than one specific class, it has more than one interface 220. Optionally, application program 106 may include an additional program module 212 that functions as a message-tracking tool and makes a record of each intra-process message that is sent in application program 106.

All intra-process messages between modules 210-212 are communicated through custom control 105. Custom control 105 defines a plurality of intra-process messaging commands 230: "send_specific_class", "notify_specific_class", "notify_all", "sequence", "register_drag_source", "send_to_drag source", "send_specific_hWnd", and "re-register". One of these commands accompanies each intra-process message from the message sender to custom control 105. Custom control 105 also defines a plurality of executables 240–247, one for each command 230. An executable is program code that is executed in response to a module 210–211 issuing a message 231 accompanied by the command which corresponds to that executable. Execution of an executable 240–247 typically results in a message 231 being given to another module 210–212. Commands 230 and messages 231 form the communications interface to which modules 210–212 must conform.

Each module 210–212 constitutes an "instance" of each specific class to which it belongs. Custom control 105 therefore defines an object-instances list 200 that comprises a plurality of records 201 for modules 210–212. Object-instances list 200 is an ordered list, and is illustratively configured as a stack of records 201. For each module 210–211, object-instances list 200 contains a separate record 201 for each class to which the module 210–211 belongs. In other words, each interface 220 of each module 210–212 corresponds to a separate record 201. Each record 201 defines the attributes of the corresponding module 210–212, including its class and return address. The class is indicated by a class entry 202, while the return address is indicated by an address (ADDR) entry 203. The return address is the address of the corresponding interface 220—for example, the hWnd in Windows. Illustratively, individual classes are indicated by positive integers in class entries 202. A "0" in class entry 202 indicates that the corresponding module 210–211 responds only to the "notify_all" command. And a negative integer in class entry 202 identifies the corresponding module 210–212 as a "universal recipient" that is, a recipient of all intra-process messages irrespective of who they are intended for. Message-tracking module 212 is identified in instance list 200 by a negative integer in class entry 202 as being a "universal recipient". Object-instances list 200 serves as a means for modules 210–212 to become registered for receipt of messages.

Executables 240–247 which correspond to messaging commands 230 are flowcharted in FIGS. 3–10. Executable 240 which corresponds to the "sequence" command is flowcharted in FIG. 3. The "sequence" command is accompanied by a message 231 without data. In response to issuance of the "sequence" command by a module 210–211, at step 300, executable 240 changes the existing order of searching instance list 200, from top-to-bottom to bottom-to-top or vice versa, at step 302. Executable 240 effects the change by changing the contents of a sequence entry 250 in custom control 105. The initial, or default, contents of sequence entry 250 indicate a top-to-bottom search sequence. Operation of executable 240 then ends, at step 304.

Figure 4:
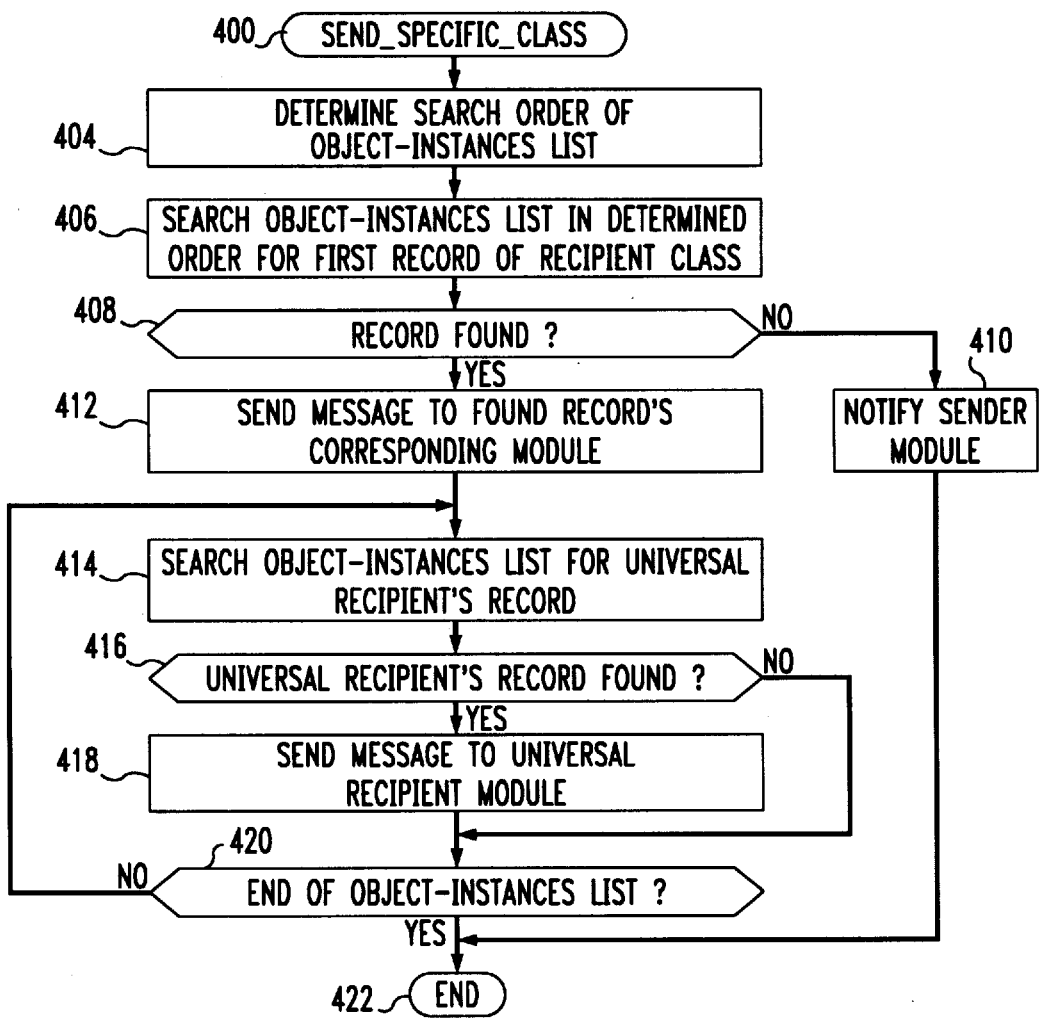
FIG. 4 is a flow diagram of operations executed in the computer of FIG. 1 in response to a "send_specific_class" command.

Executable 241 which corresponds to the "send_specific_class" command is flowcharted in FIG. 4. The "send_specific_class" command is accompanied by a recipient class identifier and by a message 231. In response to issuance of the "send_specific_class" command, at step 400, executable 241 determines the search order of object-instances list 200 from sequence entry 250, at step 404, and searches object-instances list 200 in the specified order for the first record 201 that has the class which is specified by the recipient class identifier in its class entry 202, at step 406. If such a record 201 is not found, as determined at step 408, executable 241 notifies the sender module 210–211, by sending an error indication to the module 210–211 that is identified by the message's return address, at step 410, and then proceeds to end its operation, at step 422. If a record 201 having the class specified by the recipient class identifier is found, as determined at step 408, executable 241 sends the command's accompanying message 231 to the module 210–211 that corresponds to the found record 201, at step 412. Executable 241 further searches object-instances list 200 for records 201 of any "universal recipient" modules 212 (e.g., records 201 having a negative integer in class entry 202), at step 414. Upon finding a "universal recipient" record 201, at step 416, executable 241 sends the message 231 to the corresponding "universal recipient"module 212, at step 418. If the end of object-instances list 200 has not been reached, as determined at step 420, executable 241 returns to step 414 to continue searching object-instances list 200 for another "universal recipient" record 201. Upon reaching the end of object-instances list 200, or if a "universal recipient" record 201 is not found at step 416, before the end of object-instances list 200 is reached at step 420, executable 241 ends its operation, at step 422.

Figure 5:
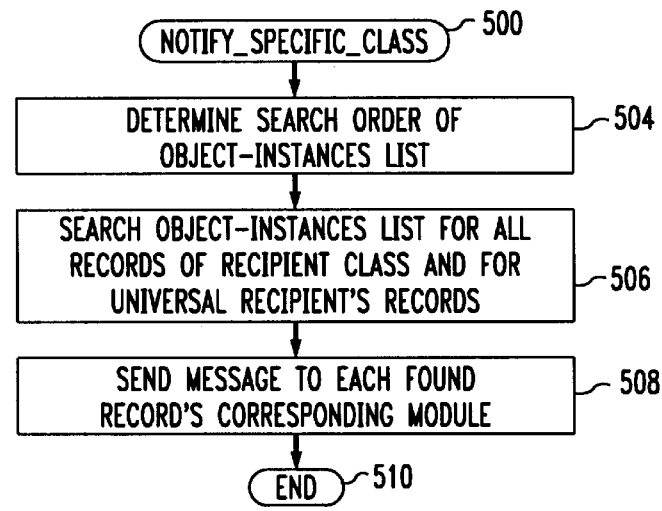
FIG. 5 is a flow diagram of operations executed in the computer of FIG. 1 in response to a "notify_specific_class" command.
Figure 6:
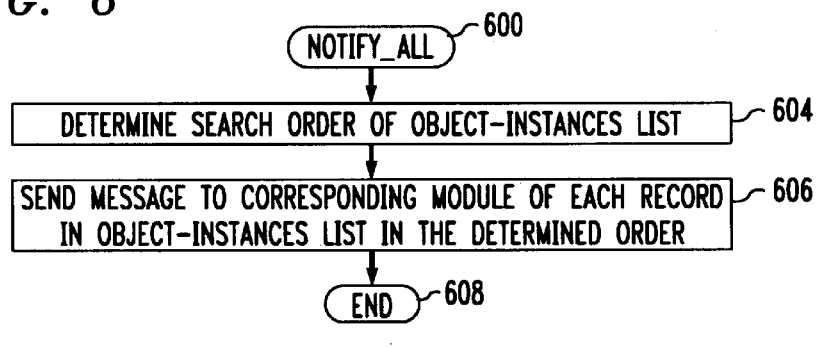
FIG. 6 is a flow diagram of operations executed in the computer of FIG. 1 in response to "notify_all" command.

Executable 242 which corresponds to the "notify_specific_class" command is flowcharted in FIG. 5. The "notify_specific_class" command is accompanied by a recipient class identifier and by a message 231. In response to the issuance of the "notify_specific_class" command, at step 500, executable 242 determines the search order of object-instances list 200 from sequence entry 250, at step 504, and searches object-instances list 200 in the determined order for any and all records 201 that have either the class that is specified by the recipient class identifier or "universal recipient" class indicated in class entry 202, at step 506. Executable 241 sends the command's accompanying message 231 to each module 210–211 that corresponds to each record 201 found at step 506, at step 508. Executable 242 then ends its operation, at step 510. Executable 243 which corresponds to the "notify_all" command is flowcharted in FIG. 6. The "notify_all" command is accompanied by a message 231. In response to the issuance of the "notify all" command, at step 600, executable 243 determines the search order of object-instances list 200 from sequence entry 250, at step 604, and sends the accompanying message 231 to each module 210–211 that corresponds to each record 201 in object-instances list 200, at step 606, in the determined order. Executable 243 then ends its operation, at step 608.

Figure 7:
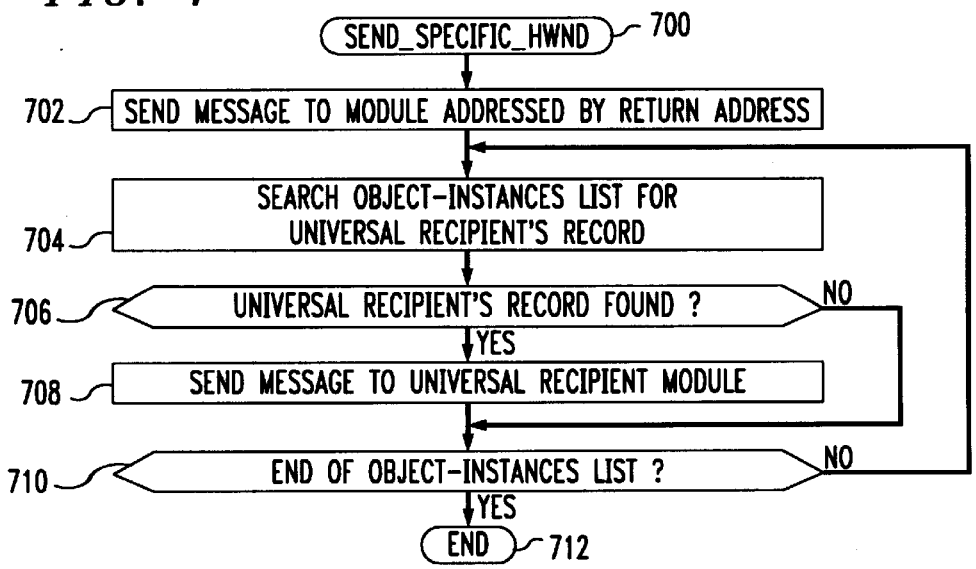
FIG. 7 is a flow diagram of operations executed in the computer of FIG. 1 in response to a "send_specific_hWnd" command.

Executable 244 which corresponds to the "send_specific_hWnd" command is flowcharted in FIG. 7. The "send_specific_hWnd" command is accompanied by a recipient address (which is the return address from some previous message), and by a message 231. In response to the issuance of the "send_specific_hWnd" command, at step 700, executable 253 sends the command's accompanying message 231 to the recipient address, at step 702. Executable 253 further searches object-instances list 200 for records 201 of any "universal recipient" modules 212, at step 704. Upon finding a "universal recipient" record 201, at step 706, executable 253 sends the message 231 to the corresponding "universal recipient" module 212, at step 708. If the search has not reached the end of object-instances list 200, as determined at step 710, executable 253 returns to step 704 to continue searching object-instances list 200 for another "universal recipient" record 201. Upon reaching the end of object-instances list 200, or if a "universal recipient" record 201 is not found, at step 706, before the end of object-instances list 200 is reached at step 710, executable 244 ends its operation, at step 712.

Figure 8:
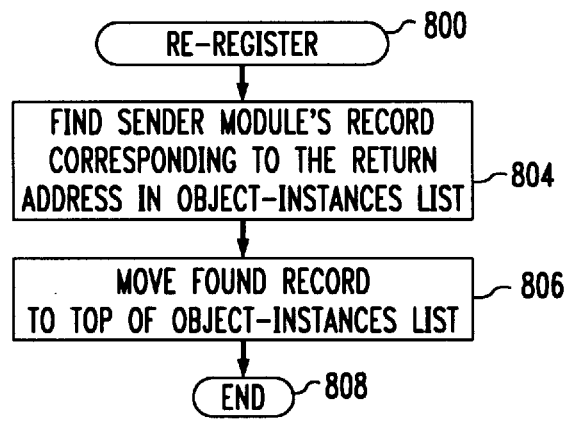
FIG. 8 is a flow diagram of operations executed in the computer of FIG. 1 in response to a "re-register" command.

Executable 245 which corresponds to the "re-register" command is flowcharted in FIG. 8. The "re-register" command is accompanied by a message 231 without data. In response to the issuance of the "re-register" command, at step 800, executable 245 uses the return address to find the sender module's corresponding record 201 in object-instances list 200, at step 804. Upon finding that record 201, executable 245 moves that record 201 to the top of object-instances list 200, at step 806. Executable 245 then ends its operation, at step 808.

Figure 9:
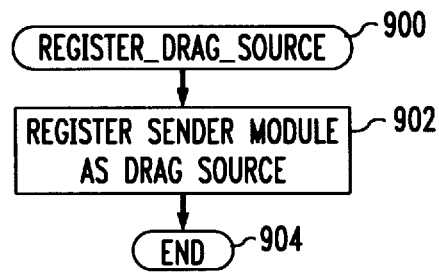
FIG. 9 is a flow diagram of operations executed in the computer of FIG. 1 in response to a "register_drag_source" command.

Executable 246 which corresponds to the "register_drag_source" command is flowcharted in FIG. 9. This command is accompanied by a message 231 without data. This command is issued by a module 210–211 in response to designation of the object in an object-verb or verb-object type of operation, e.g. in response to a pointer (e.g., a mouse) "drag" operation of a "drag-and-drop" operation pair being performed on that module 210–211. In response to the issuance of the "register drag source" command, at step 900, executable 246 registers the return address of the module 210–211 that issued the command at step 900 as the drag source in drag-source entry 252 of custom control 105, at step 902. Executable 246 then ends its operation, at step 904.

Figure 10:
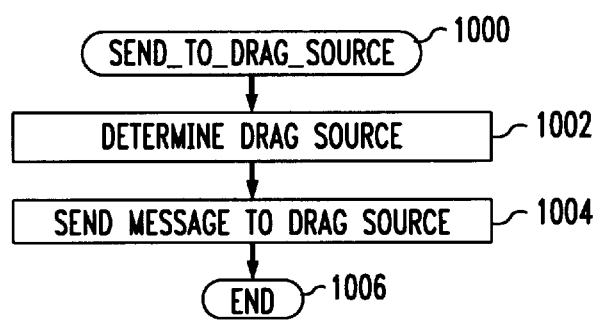
FIG. 10 is a flow diagram of operations executed in the computer of FIG. 1 in response to a "send_to_drag_source" command.

Executable 247 which corresponds to the "send_to_drag_source" command is flowcharted in FIG. 10. This command is accompanied by a message 231. This command is optionally issued by a module 210–211 in response to designation of the verb in an object-verb or verb-object type of operation. e.g., in response to a pointer "drop" operation of a "drag-and-drop" operation pair being performed on that module 210–211. In response to the issuance of the "send_to_drag source" command, at step 1000, executable 247 determines the identity of the drag source from drag-source entry 252, at step 1002, and sends the command's accompanying message 231 to the determined drag-source module 210–211, at step 1004. Executable 247 then ends its operation, at step 1006.

Of course, various changes and modifications to the illustrative embodiment described above will be apparent to those skilled in the art. For example, a module may change its class depending upon its own internal state (such as what types of messages it wants to receive). This necessitates an additional command that enables the module to change the contents of the class field of its records in the object-instances list. Also, the mechanism can be used equally well to implement either the OBJECT_VERB or VERB_OBJECT user-interaction paradigm. Moreover, the intra-process communications mechanism can be implemented in Visual Basic without using custom control—for example, in the following manner.

To facilitate the anonymous communication between various modules in application, a DD_MSG Engine software module uses three CommandButton pseudo-controls to communicate between windows in a Multiple Documents Interface (MDI) application. These buttons are: DD_MSG_TO, DD_MSG_FROM, and DD_DRAG_FROM. The TO and FROM buttons are used to actually send and receive messages. The DRAG_FROM is used to facilitate the use of Drag/Drop with the Engine.

Before a message can be sent, the DD_MSG_FROM button must be checked to see if the Engine is currently in use. If it is, the window must wait and try again. The DD_MSG_TO button must be Set to the CommandButton of the destination form. Any actual data to be sent is included in the .TAG property of the DD_MSG_TO button. The type of message and any special parameters are placed in the DD_MSG_TO button's .HelpContextID property. The DD_MSG_FROM button should then be Set to the message-receiving CommandButton of the sending window. The message is actually sent by setting DD_MSG_TO= True.

A window receives a message in the Click event of its message button. This event code should examine the message type to determine if and how to respond to the message. The message transaction is complete when any data sent with the message is no longer needed, and the DD_MSG_FROM button is cleared. If a window requires additional access to such data, it must make a copy of it before clearing the button. When the message transaction is complete, the receiving window must clear the DD_MSG_FROM button (Set it to Nothing) to allow other windows to use the engine. This must be done, even if the message is ignored. The window can then reply to the message, send a message to another window, or simply exit.

A window that is capable of receiving messages should DD_REGISTER itself, using the name of its message button. It should also load its .TAG property with a globally known constant. These items should be performed in the Load event for the window. The Engine keeps a list of the registered windows (in most-recently-used order), and can address a message based upon the .TAG property of the message button's .PARENT. It can also supply the address of the most recently registered window. If multiple windows having the same .TAG value are registered, the Engine will provide the address of the most recently registered window. It might be desirable, therefore, to include a DD_REGISTER in a form's Active event. If a given instance of a window registers again, it is simply moved to the "most recently registered" position in the stack. Buttons in the registration stack are identified uniquely by their .hWnd property. Therefore, multiple windows with the same .TAG property can be registered simultaneously without conflict.

The Engine provides a subroutine to send a given message to all registered windows within the application. The messages are sent in the order of most-recently to least-recently registered. If multiple windows with the same .TAG property are registered, they all receive the broadcast.

When a drag is started, the source window must execute a DD_Register_Drag subroutine call. This will allow the drag destination to know where the drag originated. This information will be used in both the DragOver and the DragDrop events. The drag destination should use a combination of the drag type, the drag source form's .TAG property, and any information contained in the drag message to determine whether a drop would be valid or not. It is the obligation of the drag destination to signal the user as to whether a drop can be performed, and what it would accomplish. Upon receipt of the drop event, the drag destination can address a message to the drag source (using information from the DD_Register_Drag operation), or it can perform the necessary actions on its own. The method used should be determined by what action needs to be accomplished.

When a message is sent, a message type and a message parameter are included. These are contained in the receiving button's .HelpContextID property. In addition, other information can be included with a message by placing it in the .TAG property of the receiving button. A variety of routines are provided with the DD_MSG engine to help to facilitate this. Message data could be organized into records, and further sub-divided into fields. Routines are provided to help to build and to examine information formatted in this way. The specific format used illustratively mimics the format commonly used by grid and spreadsheet-type controls. This is done in anticipation of the use of such controls to help to facilitate the transmission of such data by the engine.

Such changes and modifications can be made without departing from the spirit and the scope of the invention and without diminishing its attendant advantages. It is therefore intended that such changes and modifications be covered by the following claims.

The invention claimed is:

1. A method of intra-process communicating between a plurality of program modules of a single process each belonging to at least one of a plurality of different classes of modules, comprising the steps of:

in response to an executing one of the modules of the single process that is executing under control of a Windows operating system issuing one of a plurality of commands each of which is accompanied by a message and a class identifier, executing the one command's corresponding executable from among a plurality of executables each corresponding to a different one of the commands;

by execution of the one command's corresponding executable, selecting by class, in a manner specified by the one command's corresponding executable from among a plurality of different manners each specified by a corresponding executable of a different one of the plurality of commands, at least one of the modules which belongs to the identified class from an object-instances list of characterizations of the modules, each of which module's characterizations indicates the class of the corresponding module, and further by the execution of the one command's corresponding executable, sending the message to the selected at least one of the modules of the single process thereby to effect intra-process messaging between the modules of the single process.

2. The method of claim 1 wherein:

the step of executing comprises the step of
in response to the executing one of the modules issuing a first one of the plurality of commands accompanied by the message and the class identifier, executing the first one command's corresponding executable; and the step of selecting comprises the step of
in response to execution of the first one command's corresponding executable, selecting from an ordered said object-instances list a module whose characterization is a first-encountered characterization in said ordered object-instances list that indicates the identified class.

3. The method of claim 2 wherein:

the step of selecting at least one of the modules further comprises the step of
by execution of the first one command's corresponding executable, selecting from the ordered object-instances list a module whose characterization indicates a class of universal receiver.

4. The method of claim 2 further comprising the steps of:

in response to an executing individual one of the modules issuing a second one of the plurality of commands, executing the second one command's corresponding executable; and by execution of the second one command's corresponding executable, placing the characterization of the individual one of the modules that issued the second command module at a front of the ordered object-instances list.

5. The method of claim 1 wherein:

the step of executing comprises the step of
in response to the executing one of the modules issuing a first one of the plurality of commands accompanied by the message and the class identifier, executing the first one command's corresponding executable;

the step of selecting comprises the step of
by execution of the first one command's corresponding executable, searching the object-instances list for a module whose characterization includes the identified class; and the step of sending comprises the steps of
in response to finding in the object-instances list the module whose characterization indicates the identified class, sending the message to the found module, and in response to not finding in the object-instances list the module whose characterization indicates the identified class, sending a message to the one of the modules that issued the first one command.

6. The method of claim 1 wherein:

the step of executing comprises the step of
in response to the executing one of the modules issuing a first one of the plurality of commands accompanied by the message and the class identifier, executing the first one command's corresponding executable; and the step of selecting comprises the steps of
by execution of the first one command's corresponding executable, determining from stored control information whether an ordered said object-instances list is to be searched in a forward or a backward direction, in response to the determination, searching the ordered object-instances list in the direction determined from the stored control information, and in response to the searching, selecting from the ordered object-instances list a module which is first encountered during the search whose characterization indicates the identified class.

7. The method of claim 6 further comprising the steps of:

in response to an executing one of the modules issuing a second one of the plurality of commands, executing the second one command's corresponding executable; and by execution of the second one command's corresponding executable, changing the direction of searching that is indicated by the stored control information.

8. The method of claim 1 wherein:

the step of executing comprises the step of
in response to the executing one of the modules issuing a first one of the plurality of commands accompanied by the message and the class identifier, executing the first one command's corresponding executable; and the step of selecting comprises the step of
by execution of the first one command's corresponding executable, selecting from the object-instances list each module whose characterization indicates the identified class.

9. The method of claim 8 wherein:

the step of selecting at least one of the modules further comprises the step of
by execution of the first one command's corresponding executable, selecting from the object-instances list each module whose characterization indicates a class of universal receiver.

10. The method of claim 1 further comprising the steps of:

in response to an executing one of the modules issuing a second one of the plurality of commands accompanied by a second message, executing the second one command's corresponding executable;

by execution of the second one command's corresponding executable, selecting from the object-instances list each module having a characterization in the object-instances list; and further by execution of the second one command's corresponding executable, sending the second message to each selected module.

11. The method of claim 1 further comprising the steps of:

in response to an executing individual one of the selected modules issuing a second command of the plurality of commands accompanied by a second message and a return address of the one module that issued the one command, executing the second command's corresponding executable; and by execution of the second command's corresponding executable, sending the second message to the return address.

12. The method of claim 11 further comprising the steps of:

further by execution of the second command's corresponding executable, selecting from the object-instances list a module whose characterization indicates a class of universal receiver; and further by execution of the second command's corresponding executable, sending the second message to the selected module.

13. The method of claim 1 further comprising the steps of:

in response to a pointer drag operation being executed with respect to a first one of the modules, the first one of the modules issuing a second one of the commands accompanied by an address of the first one of the modules;

in response to the first one of the modules issuing the second one of the commands, executing the second one command's corresponding executable;

by execution of the second one command's corresponding executable, storing the address of the first one of the modules;

in response to a pointer drop operation being executed with respect to a second one of the modules, the second one of the modules issuing a third one of the commands accompanied by a second message;

in response to the second one of the modules issuing the third one of the commands, executing the third one command's corresponding executable; and by execution of the third one command's corresponding executable, sending the second message to the stored address.

14. The method of claim 1 wherein:

the accompanying message comprises a message-type indication, message data, and a return address of the module that issued the one command.

15. The method of claim 1 wherein:

the step of executing the one command's corresponding executable is performed under control of a Windows custom control utility of the Windows operating system.

16. A computer comprising:

a memory for storing an application program comprising a plurality of program modules each belonging to at least one of a plurality of different classes of modules;

the memory further storing a control arrangement that defines a plurality of executables each corresponding to a different one of a plurality of commands, and an object-instances list of characterizations of the modules, each of which characterizations indicates the class of the corresponding module; and a processor connected to the memory and operating under control of a Windows operating system for executing a single process comprising the plurality of the program modules and further for executing the executables, the processor being responsive to an executing one of the modules issuing one of the commands each of which is accompanied by a message and a class identifier, for executing the one command's corresponding executable and thereby selecting from the object-instances list by class, in a manner specified by the one command's corresponding executable from among a plurality of different manners each specified by a corresponding executable of a different one of the plurality of commands, at least one of the modules which belongs to the identified class, and sending the message to the selected at least one of the modules thereby to effect intra-process messaging between the modules of the single process.

17. The computer of claim 16 wherein:

the control arrangement comprises a Windows custom control utility of a Window operating system.

18. A computer-usable program storage device having embodied therein means for effecting intra-process communications between a plurality of program modules of a single process each belonging to at least one of a plurality of different classes of modules, said means being computer-readable program code means for causing the computer to perform the functions of:

in response to an executing one of the modules of the single process that is executing under control of a Windows operating system issuing one of a plurality of commands each of which is accompanied by a message and a class identifier, executing the one command's corresponding executable from among a plurality of executables each corresponding to a different one of the commands;

by execution of the one command's corresponding executable, selecting by class, in a manner specified by the one command's corresponding executable from among a plurality of different manners each specified by a corresponding executable of a different one of the plurality of commands, at least one of the modules which belongs to the identified class from an object-instances list of characterizations of the modules, each of which module's characterizations indicates the class of the corresponding module; and further by the execution of the one command's corresponding executable, sending the message to the selected at least one of the modules of the single process thereby to effect intra-process messaging between the modules of the single process.

19. The method of claim 1 further comprising the steps of:

in response to an executing individual one of the modules issuing a second one of the plurality of commands, executing the second one command's corresponding executable; and by execution of the second one command's corresponding executable, changing the class of the individual module indicated by the individual module's characterization in the object-instances list.

* * * * *